US 10,774,939 B2

(12) United States Patent
Pickett et al.

(10) Patent No.: US 10,774,939 B2
(45) Date of Patent: Sep. 15, 2020

(54) VALVE WITH INTEGRAL INSERT-CAST SEAT AND RELATED METHOD

(71) Applicant: Cla-Val Co., Costa Mesa, CA (US)

(72) Inventors: Martin W. Pickett, San Juan Capistrano, CA (US); Robert Lewis Ogden, Jr., Corona, CA (US); David Rose, Fountain Valley, CA (US); Robert Folk, Laguna Beach, CA (US); Ryan W. Pickett, Costa Mesa, CA (US)

(73) Assignee: Cla-Val Co., Costa Mesa, CA (US)

( * ) Notice: Subject to any disclaimer, the term of this patent is extended or adjusted under 35 U.S.C. 154(b) by 192 days.

(21) Appl. No.: 15/952,006

(22) Filed: Apr. 12, 2018

(65) Prior Publication Data

US 2019/0316700 A1 Oct. 17, 2019

(51) Int. Cl.
*F16K 27/02* (2006.01)
*B23P 15/00* (2006.01)

(52) U.S. Cl.
CPC ............ *F16K 27/02* (2013.01); *B23P 15/001* (2013.01); *Y10T 137/0491* (2015.04); *Y10T 137/7923* (2015.04)

(58) Field of Classification Search
CPC ......... Y10T 137/7923; Y10T 137/0491; F16K 27/02; B23P 15/001
USPC ........................................ 251/359, 331, 332
See application file for complete search history.

(56) References Cited

U.S. PATENT DOCUMENTS

| 1,595,227 | A | * | 8/1926 | Croce | F02M 21/00 |
| | | | | | 220/86.2 |
| 1,751,664 | A | * | 3/1930 | Smith | F01L 3/22 |
| | | | | | 123/188.8 |
| 1,770,112 | A | * | 7/1930 | Smith | F01L 3/22 |
| | | | | | 251/359 |
| 1,949,150 | A | * | 2/1934 | Eplett | F16K 17/08 |
| | | | | | 137/470 |
| 1,949,614 | A | * | 3/1934 | McDonald | F01L 3/22 |
| | | | | | 123/188.8 |
| 1,981,965 | A | * | 11/1934 | Morgan | F04D 9/001 |
| | | | | | 417/200 |
| 2,595,671 | A | * | 5/1952 | Greene | F16K 27/0272 |
| | | | | | 137/243.6 |
| 2,677,876 | A | | 5/1954 | Juhnke et al. | |
| 3,170,452 | A | | 2/1965 | Dobovan | |
| 3,593,400 | A | | 7/1971 | Geiselman et al. | |
| 3,604,089 | A | | 9/1971 | Karlsson | |

(Continued)

FOREIGN PATENT DOCUMENTS

CN    204533591 U    8/2015
DE    19644356 C2    4/1998
(Continued)

*Primary Examiner* — Craig M Schneider
*Assistant Examiner* — Frederick D Soski
(74) *Attorney, Agent, or Firm* — Kelly & Kelley, LLP

(57) ABSTRACT

A valve device includes a metal valve body defining a water passageway between an inlet and an outlet of the body. A valve seat of a different material than the valve body is insert-cast molded integral with the valve body. The configuration of the valve seat and the mass of the valve body surrounding the seat being sufficiently large reduces a chilling effect during molding such that a pressure-tight and waterproof interface is formed between adjacent surfaces of the valve body and the valve seat.

24 Claims, 7 Drawing Sheets

(56) References Cited

U.S. PATENT DOCUMENTS

| | | | |
|---|---|---|---|
| 4,516,594 A | | 5/1985 | Martin et al. |
| 4,570,585 A | | 2/1986 | Hayashi |
| 4,676,482 A | * | 6/1987 | Reece ..................... F01L 3/22 |
| | | | 251/365 |
| 4,688,527 A | | 8/1987 | Mott et al. |
| 4,723,518 A | | 2/1988 | Kawasaki et al. |
| 8,430,113 B2 | | 4/2013 | Suetome et al. |
| 8,511,290 B2 | | 8/2013 | Okumura et al. |
| 2006/0060813 A1 | * | 3/2006 | Iwabuchi ................. F16K 7/16 |
| | | | 251/331 |
| 2006/0196201 A1 | | 9/2006 | Sendo et al. |
| 2009/0020722 A1 | * | 1/2009 | Masamura .......... F16K 27/0236 |
| | | | 251/331 |
| 2009/0020723 A1 | * | 1/2009 | Masamura ................ F16K 7/16 |
| | | | 251/331 |
| 2010/0294970 A1 | * | 11/2010 | Re ...................... F16K 31/1268 |
| | | | 251/322 |
| 2011/0088670 A1 | * | 4/2011 | Okumura .................. F16K 1/44 |
| | | | 123/568.11 |
| 2012/0193564 A1 | * | 8/2012 | Takeuchi ............ F16K 27/0236 |
| | | | 251/331 |

FOREIGN PATENT DOCUMENTS

| | | |
|---|---|---|
| EP | 2798247 A1 | 11/2014 |
| JP | 5937371 S | 6/2016 |

\* cited by examiner

VALVE WITH INTEGRAL INSERT-CAST SEAT AND RELATED METHOD

BACKGROUND OF THE INVENTION

The present invention generally relates to valve devices. More particularly, the present invention relates to a valve device having a valve seat of dissimilar material sealingly molded within a valve body so as to provide a leakproof and pressure-tight union between the valve seat and valve body.

Valves are devices that regulate, direct or control the flow of a fluid by opening, closing or partially obstructing various passageways. The valve is typically a mechanism that opens and closes to control the flow of fluids therethrough. One such example is of valves used in waterworks or water utility systems. The valves, such as control valves, are used to start and stop flow, regulate pressure and throttle flow, prevent back flow and relieve pressure.

Many valves utilize an inserted valve seat which is engageable with a movable valve member to close off or prevent the flow of fluid therethrough. It is desirable, and sometimes necessary, that a leakproof and pressure-tight arrangement be formed between the valve seat and the valve body into which the seat is installed so that the fluid does not flow therethrough. In some cases, it is desirable that the seat be of a different material than the surrounding valve body. For example, valve seats of waterworks valves are typically not the same material as the valve bodies. The seat is comprised of a material that has better corrosion properties to prevent corrosion or sealing surface decay when used. For example, stainless steel may be utilized as the valve seat material which is less likely to erode prematurely from the water properties and chemicals, including chlorine, chemical additives, etc. or erode due to flow conditions and suspended particles in the water, such as sand, silt, and the like which can act as an abrasive substance especially when flowing at high velocities across the seat surface. On the other hand, the body of the valve is often comprised of a different type of material, such as cast iron, ductile iron or steel. These materials are more readily formed into the larger valve body and less expensive.

Currently, there are several steps required in order to attach a valve seat of one metal or material to a valve body of another material or metal. The valve seat is usually created separately. The valve body is molded or otherwise formed with an area, including recesses and depressions, configured to receive the valve seat. After molding the valve body, these areas usually require additional treatment and finishing in order to receive the valve seat therein and have the valve seat attach thereto. Fasteners are required to attach the valve seat to the valve body. Adhesives and/or sealing gaskets or other members may also be required to form a leakproof and pressure-tight fit between the valve seat and the valve body.

It would be desirable to cast the seat into the valve body so as to form it integrally as the valve body is molded, in order to avoid the time, effort and expense associated with the aforementioned procedures and steps. However, molding the valve body to a valve seat of dissimilar material will usually not form a leakproof of pressure-tight connection therebetween. Instead, casting anomalies, such as porosity, occlusions, gaps and the like are often formed at the interface of the valve seat and valve body materials or within the valve body material as it cools and hardens around the cast-in valve seat. This results from a variety of factors, including a chilling effect formed at the interface of the cooler valve seat and the molten metal forming the valve body. The molten valve body material, as it cools and hardens, can pull away from the valve seat, form occlusions, cracks, and the like. Thus, a leakproof and pressure-tight seal is not formed between the valve body and the valve seat.

It would be desirable to have an integrally cast seat arrangement with the valve body to eliminate the assembly steps and reduce the time and cost to machine a finished part. It would be desirable to have a valve seat designed in a manner so as to prevent casting anomalies when the seat is cast in the molded valve body, so as to retain a leakproof and pressure-tight fit between the valve seat and the valve body. The present invention fulfills these needs and provides other related advantages.

SUMMARY OF THE INVENTION

The present invention is directed to a valve body having a valve seat of dissimilar material sealingly molded therein. The valve body may be of a waterworks valve device and defining a water passageway between a water inlet and a water outlet of the body. A valve seat is comprised of a material different than the metal of the valve body and is insert-cast integral with the valve body. A sealing valve member is generally aligned with the valve seat and movable between an open position away from the valve seat to permit water to pass from the inlet to the outlet of the valve body, in a closed position against the valve seat to prevent water from passing from the inlet to the outlet of the body. A diaphragm may be coupled to the sealing valve member to define a variable control chamber with an air wall or cover of the valve body.

The valve seat is hollow, such as having a generally cylindrical configuration. It may be comprised of a water corrosion-resistant material, such as stainless steel. The valve seat has an upper lip configured to engage a sealing valve member of the valve device. A bottom edge is spaced from the upper lip at a lower portion of the seat. A projection extends away from an outer surface of the seat intermediate the upper lip and bottom edge. The projection may comprise a circular flange having a plurality of spaced apart indentations along an outer perimeter thereof. The indentations of the flange are preferably closely spaced apart from one another along the perimeter of the flange. The perimeter of the flange may have a scalloped configuration. The lower portion of the seat may be of a reduced thickness as compared to the upper portion of the seat.

The seat is placed in a mold and molten metal is poured into the mold to form a valve body surrounding at least a portion of the seat, including the projection, such that the upper lip of the seat is exposed. The metal of the valve body is of a different material than the metal of the seat, and may comprise cast iron, ductile iron or steel, for example. The valve body forms a fluid flow pathway through an inlet of the valve body, through the seat into an outlet of the valve body.

A volume of a mass of the valve body surrounding the valve seat is at least twice a volume of at least an embedded portion of the seat so as to minimize chill effects of the seat material while the molten metal of the valve body cools and hardens, such that a pressure-tight and waterproof interface is formed between adjacent surfaces of the valve body and the valve seat. A ratio of an outer surface area of the valve seat compared to the volume of the valve seat is also preferably sufficiently large to reduce the chilling effect of the valve body as it cools and hardens while being molded to the seat.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
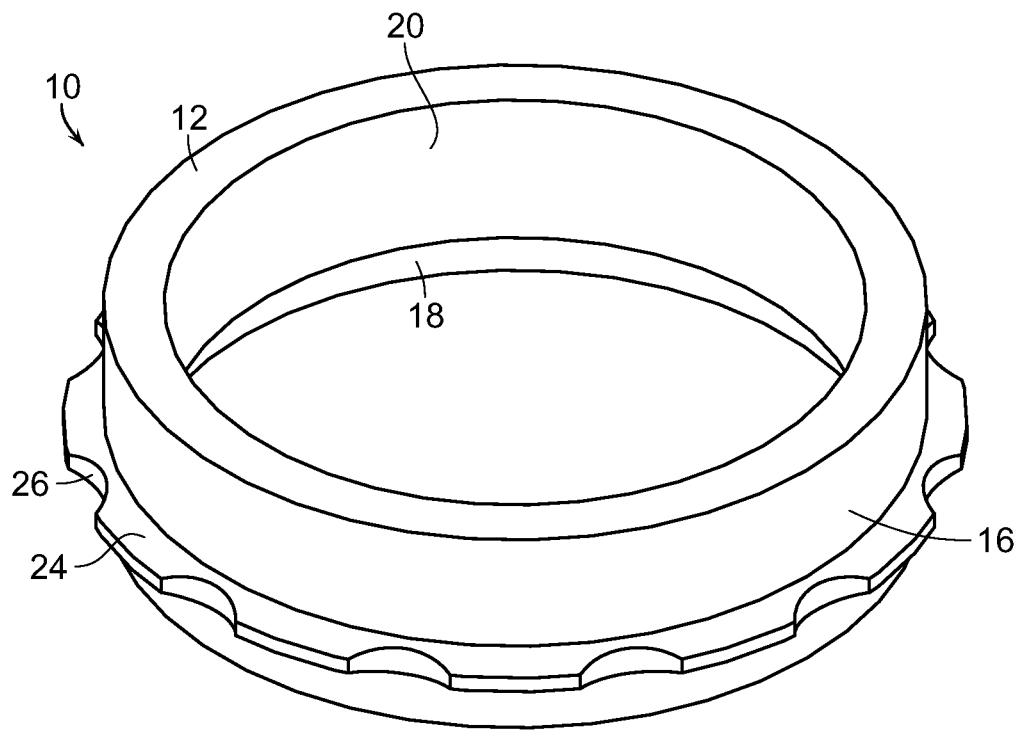
FIG. 1 is a top perspective view of a valve seat of the present invention.

As shown in the accompanying drawings, for purposes of illustration, the present invention resides in a valve seat, and more particularly a method for integrally casting the seat within a valve body of a dissimilar metal such that a leakproof and pressure-tight arrangement between the valve seat and valve body is achieved. Integrally casting the valve seat within the valve body eliminates assembly steps and reduces the time and cost to machine and assemble a finished part. Ordinarily, the valve seat would be a separate component that is threaded, bolted, or otherwise fastened to the valve body. As valve seats, at least in waterworks control valves, are typically not the same material as the valve bodies, they haven't been able to be integrally cast with a valve body of a different metal in a leakproof and pressure-tight manner. However, the valve seat of the present invention is configured such so as to be integrally cast with the valve body and form a leakproof and pressure-tight arrangement therebetween.

With reference to FIGS. 1-5, a valve seat 10 embodying the present invention is shown. The valve seat 10 is hollow so as to permit water or other fluid to pass therethrough. Typically, as illustrated, the valve seat 10 is generally cylindrical in configuration. The valve seat 10 has an upper lip 12 at an upper surface thereof which is configured to engage a sealing valve member of a valve into which the seat 10 is integrally formed. The valve seat 10 has a bottom edge or lip 14 at a generally opposite end of the valve seat. A wall 16, which is generally cylindrical in configuration, extends between the upper and lower surfaces 12 and 14.

Figure 2:
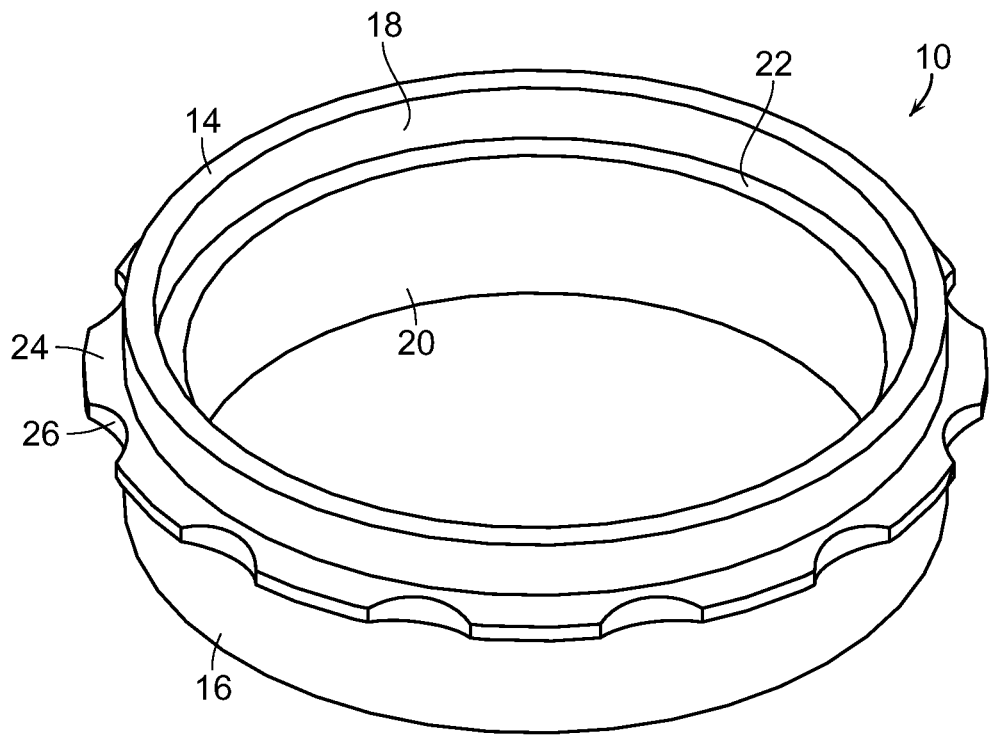
FIG. 2 is a bottom perspective view of the valve seat.
Figure 3:
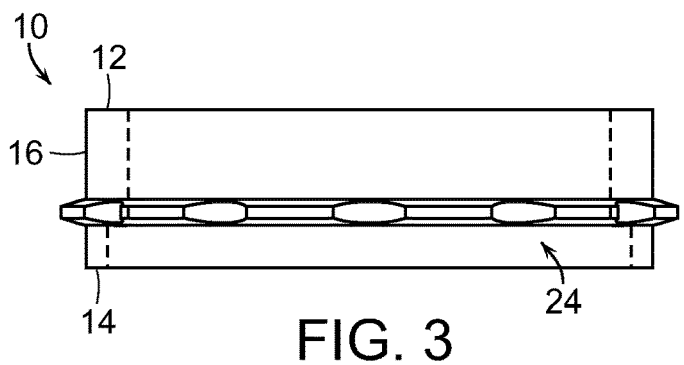
FIG. 3 is a side view of the valve seat, with dashed lines representing the different thicknesses of the valve seat along a length thereof.
Figure 4:
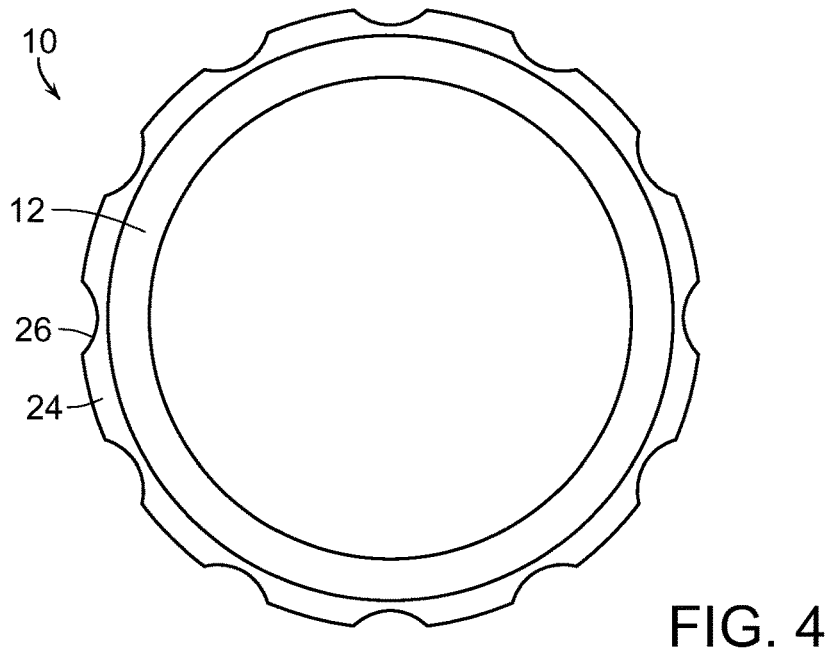
FIG. 4 is a top view of the valve seat.
Figure 5:
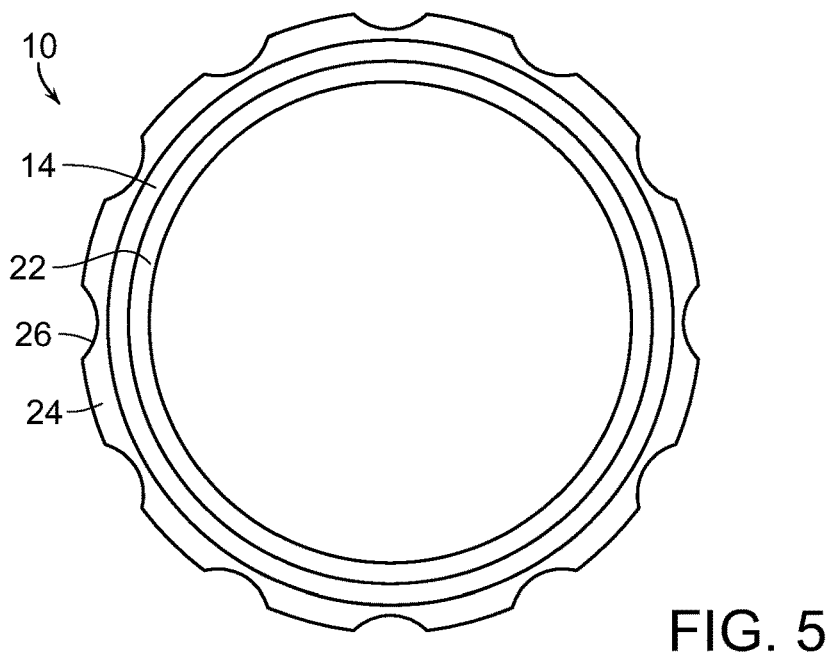
FIG. 5 is a bottom view of the valve seat.

With continuing reference to FIGS. 1-3, a lower portion 18 of the valve seat 10 is of reduced thickness or wall width compared to an upper portion 20. This may be, as illustrated, by molding or machining the valve seat 10 such that the lower portion 18 is of reduced cross-sectional thickness so as to form a ledge 22 along an inner circumference of the valve seat 10, as particularly shown in FIG. 2. In accordance with the present invention, to reduce a casting chill effect or heat sink properties, the valve seat 10 is designed to have a minimum amount of material thickness in areas where it contacts the valve body material. Reducing the thickness of the lower portion 18 of the valve seat 10 minimizes the amount of material thickness, causing it to have less mass or volume. It also creates an enlarged surface area of the valve seat 10. In accordance with the present invention, the ratio of the valve seat surface area to the valve seat volume is sufficiently large to reduce the chilling effect of the surrounding valve body metal as it cools and hardens.

The upper portion 20 of the valve seat 10, however, must be of a sufficient thickness so that the upper lip 12 has a sufficient surface area so as to present a sufficiently large area to provide a seal between the upper lip 12 and the sealing valve member of the valve. As is shown and explained herein, such as FIG. 9, at least a portion of the upper portion 20 of the valve seat 10 extends out of the valve body and thus is not fully in contact with the body material as it hardens and thus its chill effects have a lesser impact on the cooling characteristics of the body metal.

As illustrated, in a particularly preferred embodiment, a projection 24, in the form of a peripheral, circular flange, extends away from an outer surface of the wall 16, intermediate the upper lip 12 and lower lip 14. The flange 24 includes a plurality of spaced apart indentations or notches 26. Preferably, these indentations 26 are closely spaced apart from one another and form substantially around the length or circumference of the flange 24, as illustrated. The indentations 26 can be formed of notches, grooves or the like. In a particularly preferred embodiment, as illustrated, the flange 24 has a scalloped configuration due to the spaced apart indentations 26. The scalloped flange detail on the valve seat 10 perimeter prevents rotational movement after cast into the valve body. The scalloped or irregular surface detail of the flange 24 improves metal-to-metal bonding properties during the casting process and prevents rotational movement of the valve seat 10 when it is machined in the body.

The valve seat 10, when utilized in connection with waterworks valves, is comprised of a relatively hard and water corrosion-resistant metal, such as stainless steel. The valve seat 10 can be machined from wrought or cast material. If seat castings are used, they can possibly be used in as-cast condition or machined for tighter tolerance fit in pattern tooling. While stainless steel is a particularly preferred metal for use in waterworks valve applications as it has anti-corrosion properties relating to the water and the sand, silt and other materials which pass through the water, it will be understood that the valve seat 10 could be comprised of other metals and materials as well. However, the valve seat 10 will be comprised of a metal or material which has higher temperature melt properties than the metal utilized in forming the valve body. Typically, the valve seat 10 is comprised of a more expensive metal than the valve body, as the valve seat must retain its surface properties throughout the life of the valve and not corrode or erode away easily.

Figure 6:
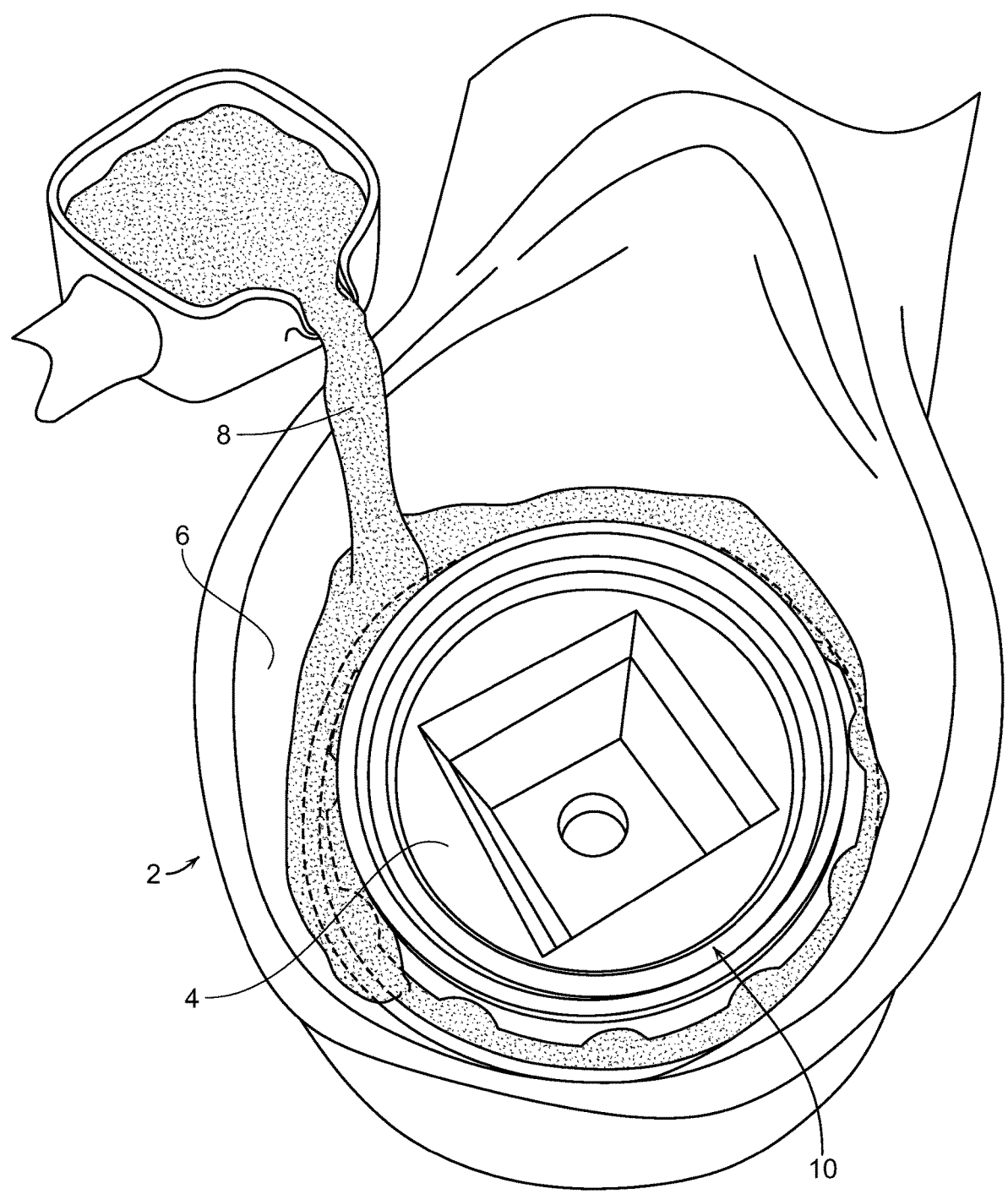
FIG. 6 is a diagrammatic view illustrating the valve seat of the present invention placed within a mold and molten metal forming a body of the valve poured within the mold to cast the valve seat therein, in accordance with the present invention.

With reference now to FIG. 6, a mold 2 is shown in which the valve seat 10 is placed within a pattern core 4. The core assembly, which includes the valve seat 10 is placed in a body pattern 6, and molten metal 8 which is to form the valve body is poured into the pattern cavities of the mold 2, allowing the molten metal 8 to fill the cavity voids around the valve seat 10. As mentioned above, the valve seat 10 is comprised of a metal or material which is dissimilar than the metal 8 poured into the mold 2 to form the valve body. For example, the valve seat 10 may be comprised of stainless steel whereas the valve body is comprised of ductile iron material, cast iron, steel, or the like. As the valve seat 10 is comprised of a metal having a higher temperature melt property than the metal 8 forming the valve body, the valve seat 10 is allowed to remain intact during the casting process.

The surface areas 10 of the valve seat which will come into contact with the molten metal 8 forming the valve body are preferably roughened, such as by sandblasting or the like, to present a roughened surface which is more apt to bond to the molten metal 8 forming the valve body. Moreover, as described above, the scalloped flange 24 is of a thickness which is kept to a minimum and includes the indentations, notches or grooves 26 referred to above so as to reduce the chill effect of the casting of the dissimilar metals. Furthermore, as mentioned above, the material thickness of the valve seat wall 16 is kept to a minimum to avoid the chill effect of the casting process with dissimilar metals. For example, the lower portion 18 of the valve seat 10 is of a reduced thickness as compared to the upper portion 20 forming the upper lip 12. This reduces the overall mass or volume of the valve seat 10 as compared to the mass or volume of the metal forming the valve body surrounding the valve seat 10. Preferably, the volume of a mass of the valve body material surrounding the valve seat 10 is at least twice the volume of at least the embedded portion of the valve seat 10 so as to minimize chill effects of the valve seat material while the molten metal 8 of the valve body cools and hardens. These factors lessen the chill effect or shrink rate between the valve seat 10 and the cooling metal 8 forming the valve body and the large relative surface area of the valve seat 10 which comes into contact with the molten metal 8 forming the valve body is sufficiently large so as to encourage metal bonding to occur for a pressure-tight and liquid seal interface therebetween.

If the valve seat 10 did not have the configuration which enables it to have a minimum material thickness, large surface area, and scalloped or indented edge flange, then the valve body material 8 in the area of the valve seat 10 would tend to cool too quickly, which could affect the shrink rate of the body material 8 in and around the integrally cast seat 10, causing separations or gaps between the contact surfaces of the valve seat 10 and the valve body material or metal 8 which would create pressure leak paths across an area such that a leakproof and pressure-tight union would not be formed between the valve seat 10 and the valve body.

Figure 7:
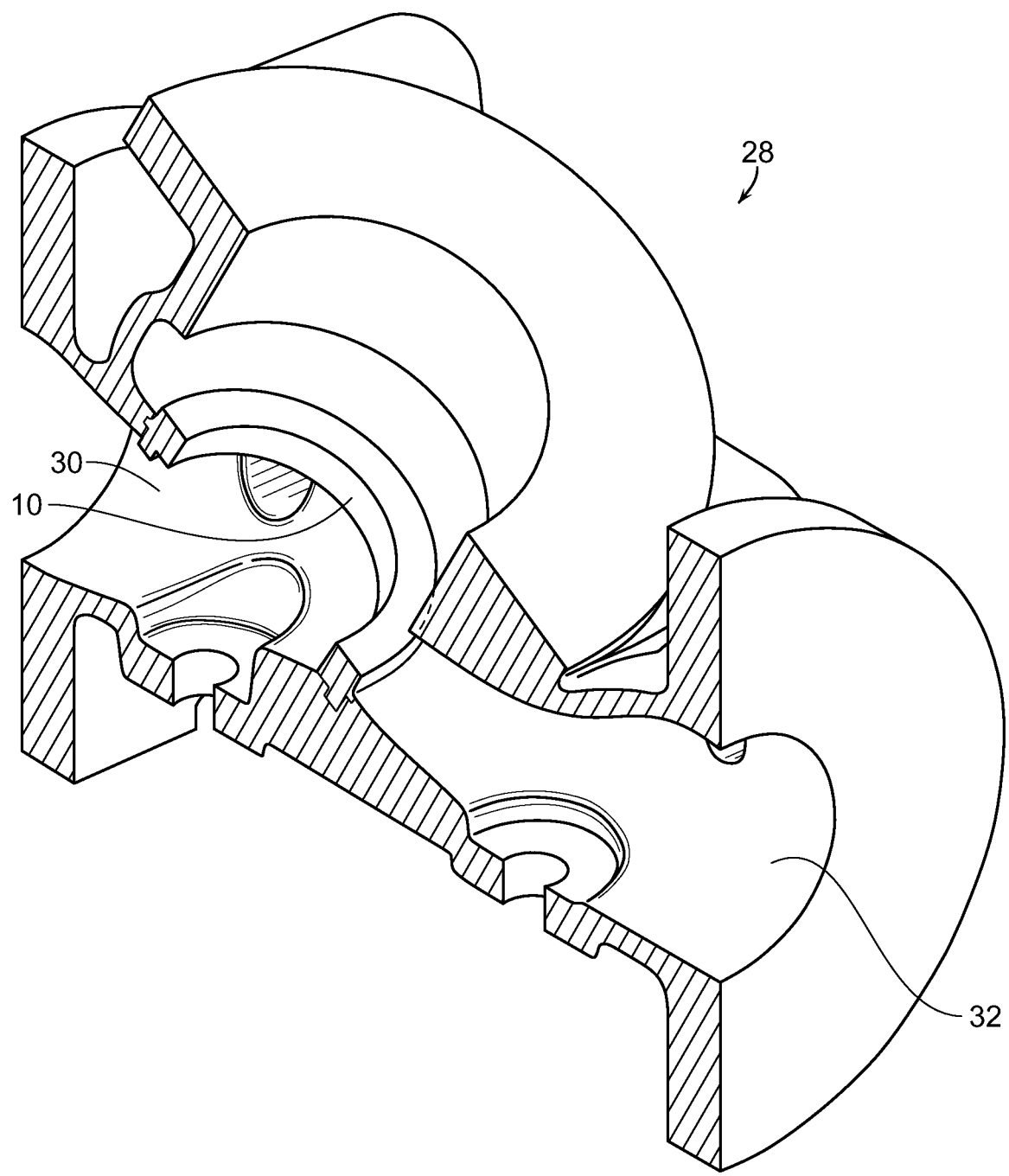
FIG. 7 is a sectioned view of a valve body having the valve seat of the present invention cast therein.

With reference now to FIG. 7, a valve body 28 is shown having the valve seat 10 integrally insert-cast therein. The valve seat 10 is disposed intermediate a water inlet 30 and a water outlet 32 of the valve body 28. The cylindrical and hollow nature of the valve seat 10 allows a fluid pathway between the inlet 30 and the outlet 32 when the valve is in an open state.

Figure 8:
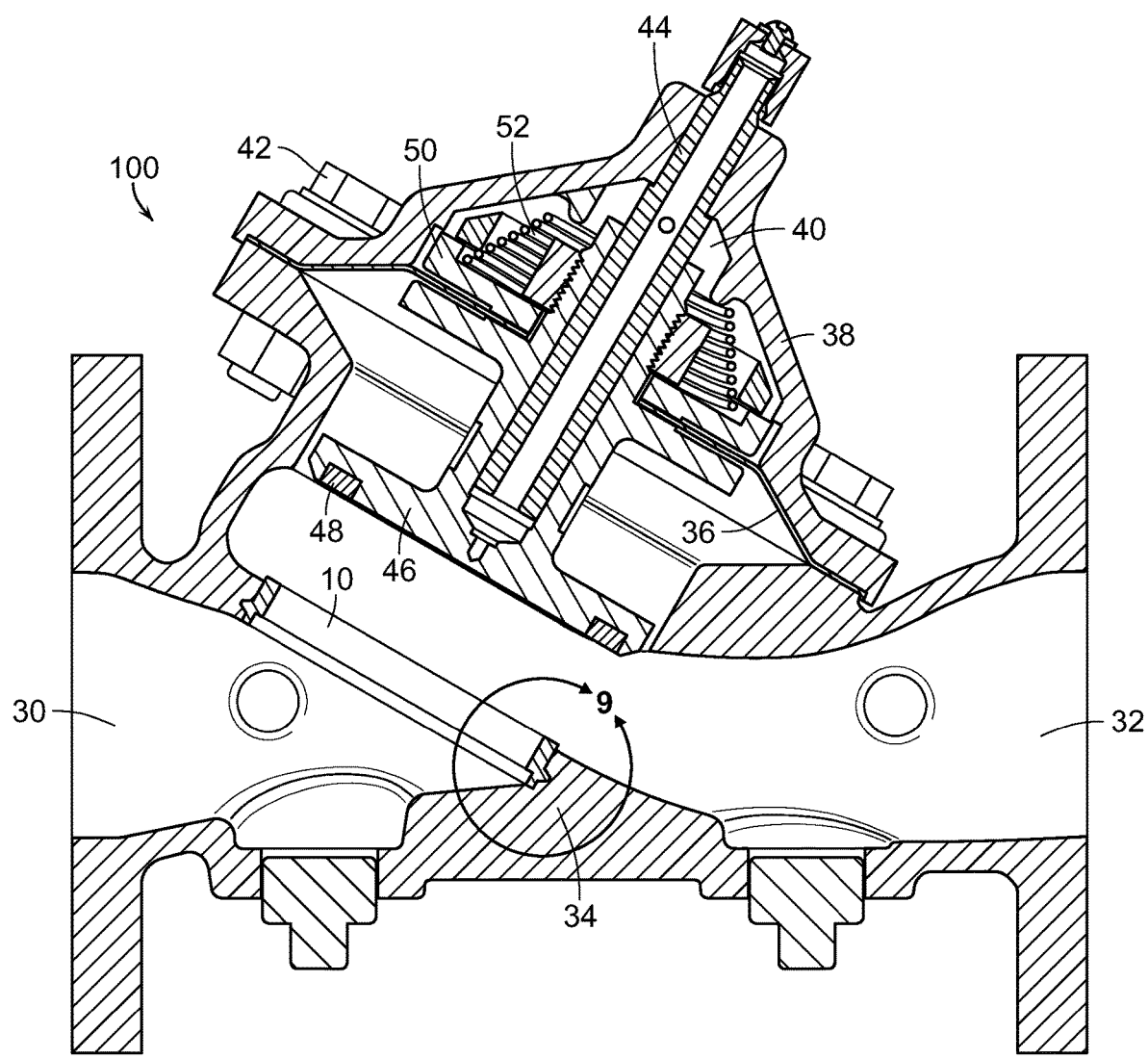
FIG. 8 is a cross-sectional view of a waterworks control valve having the valve seat integrally cast within the valve body, in accordance with the present invention.
Figure 9:
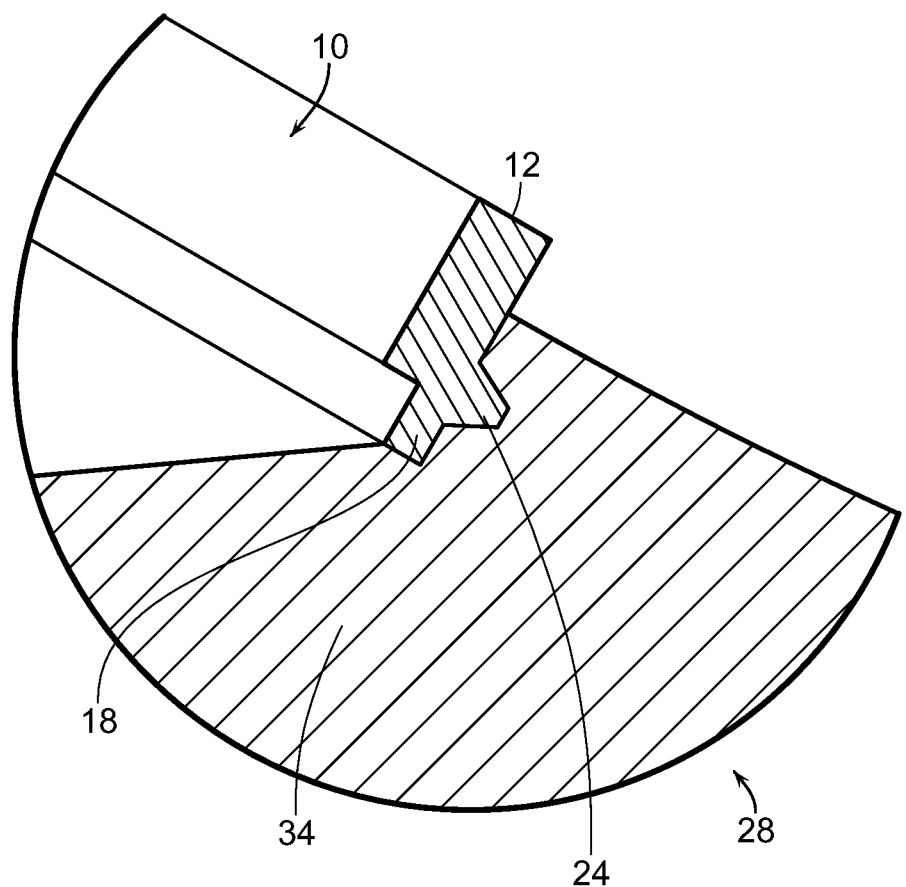
FIG. 9 is an enlarged sectional view of area "9" of FIG. 8, illustrating the valve seat integrally and sealingly cast within the valve body.

The fluid pathway between the inlet 30 and outlet 32 of the valve can be easily seen in the cross-sectional view of the valve of FIG. 8. With continuing reference to FIGS. 8 and 9, it can be seen that the volume of a mass 34 of the valve body 28 surrounding the seat 10 is significantly larger in volume or mass than the valve seat 10, or at least a portion of the valve seat into which it is adjacent to. Preferably, the volume of the mass 34 of the metal of the body 28 surrounding the valve seat 10 is at least twice a volume or mass of the valve seat 10, in order to reduce chilling effects and create a pressure-tight seal therebetween. It will also be seen that the reduced thickness lower portion 18 and flange 24 of the valve seat 10 are embedded within the valve body 28 material. However, much of the upper portion 20 of the valve seat 10, which is somewhat thicker than the reduced portion 18, extends above the valve body 28 material, so as not to negatively impact the bonding between the valve seat 10 and the valve body material as it cools and hardens, as described above. However, a sufficiently large and sturdy upper lip or valve engaging surface 12 is provided so as to provide a sealing surface with a sealing valve member when the valve is closed.

Figure 10:
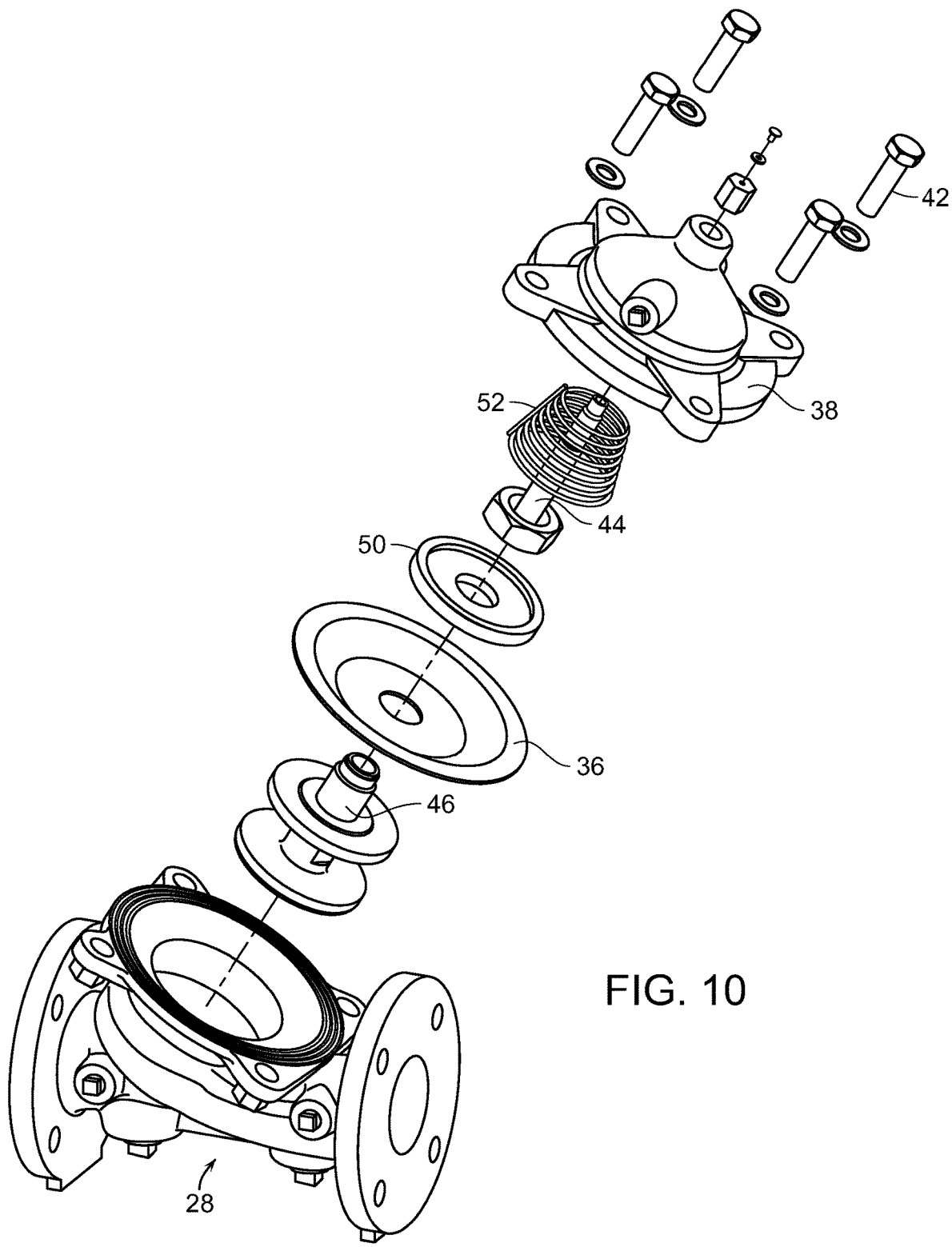
FIG. 10 is an exploded perspective view of components of an exemplary waterworks control valve incorporating the present invention.

Although the valve seat 10 having the configuration and arrangement embodying the present invention and insert-cast molded into a valve body can be used with a variety of valves, it is particularly adapted and designed for use in a waterworks control valve such as that illustrated in FIGS. 8 and 10. The valve seat 10 is insert-cast molded into the valve body 28, as described above, such that it is within the fluid flow path intermediate the water inlet 30 and the water outlet 32. A diaphragm 36 has an outer edge disposed between the valve body 28 and a valve cover 38. A variable control chamber 40 is formed between the diaphragm 36 and the inner surface of the valve cover 38. The valve cover 38 is attached to the valve body, such as by using bolts or other fasteners 42.

A valve stem 44 is operably coupled to a sealing valve member 46, which as illustrated, is a disc retainer having a mold-in disc 48. The sealing valve member 46 is generally aligned with the valve seat 10, such that the mold-in disc 48 can come into contact with the upper lip or surface 12 of the valve seat 10 so as to seal the valve seat and prevent fluid flow from the inlet 30 to the outlet 32. The valve stem 44, and the attached sealing valve member 46 as well as a diaphragm washer 50 are movable between open and closed positions. FIG. 8 illustrates the assembly in an open position such that water or other fluid can flow between the inlet 30 through valve seat 10 and to outlet 32. A spring 52 acts to bias these movable components.

Pressure within the control chamber 40 can be adjusted in a manner so as to cooperate or work against the bias of the spring 52 and the pressures applied to the diaphragm 36 to open or close the valve sealing member 46 against the valve seat 10 to open or close the valve and permit or prevent fluid flow therebetween. For example, the spring 52 may bias the valve sealing member 46 away from the valve seat 10 in an open position. However, increasing the fluid pressure within the control chamber 40, such as hydraulically utilizing other valves or devices, can pressurize the variable control chamber and cause the moving components to be pressed downwardly such that the sealing valve member 46, such as the mold-in disc 48 comes into contact with the upper lip 12 of the valve seat 10 to close the valve 100. When the valve is in a closed position, it is important that the interface and connection between the valve seat 10 and the surrounding valve body material 8, 34 be sealed and leakproof and pressure-tight so as to prevent water or other fluid to flow through the valve 100. When the valve is in a closed state, fluid pressure can be substantial and even build at the inlet 30 portion of the valve 100, and the interconnection between the valve seat 10 and the valve body 28 must be able to withstand these pressures and remain fluidly sealed. The valve seat 10 arrangement and molding process of the present invention enable this to be the case.

Although several embodiments have been described in detail for purposes of illustration, various modifications may be made without departing from the scope and spirit of the invention. Accordingly, the invention is not to be limited, except as by the appended claims.

What is claimed is:

1. A method for molding a valve body of a waterworks valve around a valve seat, comprising the steps of:
providing a hollow valve seat comprised of a metal and having an upper lip configured to engage a movable sealing valve member of the waterworks valve, a bottom edge spaced from the upper lip at a lower portion of the seat, and a projection extending away from an outer surface of the seat intermediate the upper lip and bottom edge;
placing the seat in a mold; and
pouring a molten metal into the mold to form a valve body surrounding at least a portion of the seat, including the projection, such that the upper lip of the seat is not surrounded by the molten metal, and forming a fluid flow pathway through an inlet of the valve body, through the seat and to an outlet of the valve body;
wherein the metal of the seat is selected to have a higher temperature melt property than the metal of the valve body;
wherein at least a portion of the valve seat that is embedded within the valve body is of reduced thickness or wall width compared to the upper lip of the seat so as to lessen impact of chill effects on the cooling characteristics of the valve body metal;
wherein a volume of a mass of the valve body surrounding the seat is at least twice a volume of at least an embedded portion of the seat so as to minimize chill effects of the seat material while the molten metal of the valve body cools and hardens; and
wherein a pressure tight and waterproof interface is formed between adjacent surfaces of the valve body and the seat.

2. The method of claim 1, wherein the ratio of a seat surface area to a seat volume is sufficiently large to reduce the chilling effect of the surrounding valve body metal as the valve body metal cools and hardens.

3. The method of claim 1, wherein the valve seat has a generally cylindrical configuration.

4. The method of claim 1, wherein the seat is comprised of a water corrosion resistant metal.

5. The method of claim 4, wherein the seat is comprised of stainless steel.

6. The method of claim 1, wherein the metal of the body comprises cast iron, ductile iron or steel.

7. The method of claim 1, wherein the projection comprises a circular flange having a plurality of spaced apart indentations along an outer perimeter thereof to reduce the chill effect of the casting of the dissimilar metals of the valve seat and the valve body and prevent rotational movement of the valve seat as it is machined in the valve body.

8. The method of claim 7, wherein the indentations of the flange are closely spaced apart from one another along the perimeter of the flange.

9. The method of claim 7, wherein the perimeter of the flange has a scalloped configuration.

10. The method of claim 1, wherein the sealing valve member is generally aligned with the valve seat and movable between an open position away from the valve seat to permit water to pass from the inlet to the outlet of the valve and a closed position in contact with the upper lip of the valve seat to prevent water from flowing to the outlet, and a diaphragm coupled to the sealing valve member and defining a variable control chamber with an inner wall or cover of the valve body.

11. A method for molding a valve body of a waterworks valve around a valve seat, comprising the steps of:
providing a generally cylindrical hollow valve seat comprised of a metal and having an upper lip, a bottom edge spaced from the upper lip at a lower portion of the seat, and a projection extending away from an outer surface of the seat intermediate the upper lip and bottom edge; and
pouring a molten metal into a mold containing the seat to form a valve body surrounding at least a portion of the seat, including the projection, such that the upper lip of the seat is exposed, and forming a fluid flow pathway through an inlet of the valve body, through the seat and to an outlet of the valve body;
wherein the metal of the seat is selected to have a higher temperature melt property than the metal of the valve body;
wherein the ratio of a seat surface area to a seat volume is sufficiently large to reduce the chilling effect of the surrounding valve body metal as the valve body metal cools and hardens;
wherein the projection of the valve seat comprises a circular flange having a plurality of spaced apart indentations along an outer perimeter thereof to reduce the chill effect of the casting of the dissimilar metals of the valve seat and the valve body and prevent rotational movement of the valve seat as the valve seat is machined in the valve body; and
wherein a pressure tight and waterproof interface is formed between adjacent surfaces of the valve body and the seat.

12. The method of claim 11, wherein a lower portion of the valve seat that is embedded within the valve body is of reduced thickness or wall width compared to an upper portion of the valve seat that extends into a fluid pathway defined by an inner surface of the valve body so as to lessen impact of chill effects on the cooling characteristics of the valve body metal.

13. The method of claim 11, wherein a volume of a mass of the valve body surrounding the seat is at least twice a volume of at least an embedded portion of the seat so as to minimize chill effects of the seat material while the molten metal of the valve body cools and hardens.

14. The method of claim 11, wherein the seat is comprised of a water corrosion resistant metal.

15. The method of claim 14, wherein the seat is comprised of stainless steel.

16. The method of claim 11, wherein the metal of the body comprises cast iron, ductile iron or steel.

17. The method of claim 11, wherein the indentations of the flange are closely spaced apart from one another along the perimeter of the flange.

18. The method of claim 11, wherein the perimeter of the flange has a scalloped configuration.

19. The method of claim 11, wherein the sealing valve member is generally aligned with the valve seat and movable between an open position away from the valve seat to permit water to pass from the inlet to the outlet of the valve and a closed position in contact with the upper lip of the valve seat to prevent water from flowing to the outlet, and a diaphragm coupled to the sealing valve member and defining a variable control chamber with an inner wall or cover of the valve body.

20. A method for molding a valve body of a waterworks valve around a valve seat, comprising the steps of:
- providing a generally cylindrical hollow valve seat comprised of a metal and having an upper lip, a bottom edge spaced from the upper lip at a lower portion of the seat, and a projection extending away from an outer surface of the seat intermediate the upper lip and bottom edge; and
- pouring a molten metal into a mold containing the seat to form a valve body surrounding at least a portion of the seat, including the projection, such that the upper lip of the seat is exposed, and forming a fluid flow pathway through an inlet of the valve body, through the seat and to an outlet of the valve body;
- wherein the metal of the seat is selected to have a higher temperature melt property than the metal of the valve body;
- wherein a lower portion of the valve seat that is embedded within the valve body is of reduced thickness or wall width compared to an upper portion of the valve seat that extends into a fluid pathway defined by an inner surface of the valve body so as to lessen impact of chill effects on the cooling characteristics of the valve body metal;
- wherein the ratio of a seat surface area to a seat volume is sufficiently large to reduce the chilling effect of the surrounding valve body metal as the valve body metal cools and hardens;
- wherein a volume of a mass of the valve body surrounding the seat is at least twice a volume of at least an embedded portion of the seat so as to minimize chill effects of the seat material while the molten metal of the valve body cools and hardens;
- wherein the projection of the valve seat comprises a circular flange having a plurality of closely spaced apart indentations along an outer perimeter thereof forming a scalloped configuration to reduce the chill effect of the casting of the dissimilar metals of the valve seat and the valve body and prevent rotational movement of the valve seat as the valve seat is machined in the valve body; and
- wherein a pressure tight and waterproof interface is formed between adjacent surfaces of the valve body and the seat.

21. The method of claim 20, wherein the seat is comprised of a water corrosion resistant metal.

22. The method of claim 21, wherein the seat is comprised of stainless steel.

23. The method of claim 20, wherein the metal of the body comprises cast iron, ductile iron or steel.

24. The method of claim 20, wherein the sealing valve member is generally aligned with the valve seat and movable between an open position away from the valve seat to permit water to pass from the inlet to the outlet of the valve and a closed position in contact with the upper lip of the valve seat to prevent water from flowing to the outlet, and a diaphragm coupled to the sealing valve member and defining a variable control chamber with an inner wall or cover of the valve body.

* * * * *